(12) United States Patent
Dobrusskin et al.

(10) Patent No.: US 7,515,349 B2
(45) Date of Patent: Apr. 7, 2009

(54) VARIABLE FOCUS LENS

(75) Inventors: Christoph Dobrusskin, Eindhoven (NL); Johannus W. Weekamp, Eindhoven (NL); Bernardus H. W. Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 11/911,671

(22) PCT Filed: Apr. 20, 2006

(86) PCT No.: PCT/IB2006/051220

§ 371 (c)(1),
(2), (4) Date: Oct. 16, 2007

(87) PCT Pub. No.: WO2006/111933

PCT Pub. Date: Oct. 26, 2006

(65) Prior Publication Data

US 2008/0180806 A1 Jul. 31, 2008

(30) Foreign Application Priority Data

Apr. 22, 2005 (EP) .................................. 05103307

(51) Int. Cl.
*G02B 1/06* (2006.01)
*G02B 15/00* (2006.01)
(52) U.S. Cl. ...................................... 359/665; 359/676
(58) Field of Classification Search ......... 359/665–667, 359/676, 726–732
See application file for complete search history.

(56) References Cited

U.S. PATENT DOCUMENTS

| 4,872,743 | A | 10/1989 | Baba et al. |
| 6,552,852 | B2 | 4/2003 | Hill |
| 6,560,039 | B1 | 5/2003 | Webb et al. |
| 2002/0159150 | A1 | 10/2002 | King et al. |

FOREIGN PATENT DOCUMENTS

| EP | 104960 | 4/1984 |
| EP | 266005 A2 | 5/1988 |
| EP | 1008886 A1 | 6/2000 |
| WO | 0175508 | 10/2001 |
| WO | 02088817 A1 | 11/2002 |
| WO | 03001520 A1 | 1/2003 |
| WO | 03069380 A1 | 8/2003 |
| WO | 2004077126 A1 | 9/2004 |
| WO | 2004102250 A1 | 11/2004 |
| WO | 2004102251 A1 | 11/2004 |
| WO | 2005096069 A1 | 10/2005 |

*Primary Examiner*—Darryl J Collins

(57) ABSTRACT

Optical apparatus for modifying a radiation beam, the apparatus including a variable focus lens (1) comprising a first fluid (A) and a second fluid (B) wherein the fluids are immiscible and are separated from each other by a fluid meniscus (6; 106; 206; 306) which is configurable into a configuration which is arranged to modify a predetermined vergence of an input radiation beam (15; 32; 33) and a focus control system. The optical apparatus is characterised in that the apparatus comprises a first redirector arranged to redirect the radiation beam, after having passed once through the fluid meniscus, back towards the fluid meniscus, and a second redirector arranged to further redirect the radiation beam, after having passed twice through the meniscus, back towards the fluid meniscus, wherein the configuration is arranged to further modify the vergence of the radiation beam following each of the redirections, the further modifications being arranged to provide the variable focus lens with an amplified focal power.

14 Claims, 7 Drawing Sheets

VARIABLE FOCUS LENS

The present invention relates to optical apparatus for modifying a radiation beam, particularly to optical apparatus for providing a variable focus lens with an amplified focal power.

Variable focus lenses are known in the prior art. For example, international patent application WO 03/069380 discloses a variable focus lens which comprises two immiscible fluids separated from each other by a fluid meniscus. Each fluid has a different refractive index and the meniscus acts as a lens for a radiation beam passing through the meniscus. Electrowetting forces are used to vary a curvature of the meniscus in order to vary a focal power of the lens. The lens provides a range of different focal powers, between a maximum and a minimum focal power.

Variable focus lenses, such as that described above, may be used in numerous applications, for example cameras and devices for scanning optical record carriers such as a compact disc (CD) or a conventional digital-versatile-disc (DVD). In some such applications the available focal power range is too narrow and tends to restrict overall performance of the application.

Variable focus lenses which utilise electrowetting forces to vary the curvature of the meniscus require a voltage to be applied to the lens fluids. The applied voltage may be relatively large, making switching between different focal powers relatively slow. This may hinder a performance of the variable focus lens for particular applications.

It is an object of the present invention to provide optical apparatus which includes a variable focus lens having an amplified focal power.

In accordance with a first aspect of the present invention there is provided optical apparatus for modifying a radiation beam, said apparatus including:

a) a variable focus lens comprising a first fluid (A) having a first refractive index and a second fluid (B) having a second, different, refractive index, wherein said fluids are immiscible and are separated from each other by a fluid meniscus which is configurable into a configuration which is arranged to modify a predetermined vergence of an input radiation beam, whereby said configuration determines a focal power of said lens; and b) a focus control system arranged to control said focal power by variation of the configuration of said fluid meniscus, characterised in that the optical apparatus comprises a first redirector arranged to redirect said radiation beam, after having passed once through said fluid meniscus, back towards said fluid meniscus, and a second redirector arranged to further redirect said radiation beam, after having passed twice through said meniscus, back towards said fluid meniscus, wherein said configuration is arranged to further modify the vergence of said radiation beam following each of said redirections, said further modifications being arranged to provide said variable focus lens with an amplified focal power.

The fluid meniscus configuration determines how the vergence of the radiation beam is modified when making a first pass through the meniscus. Redirection of this modified beam by the first and second redirectors causes the beam to make a second and third pass through the fluid meniscus, resulting in further modification of the beam vergence. The configuration also determines how the vergence of the beam is further modified.

A focal power of the lens is determined by the extent of the vergence modifications. In accordance with the present invention, by passing the beam through the meniscus at least a second and a third time, the further modifications incurred provide an amplification of the focal power provided by the lens.

Variation of the fluid meniscus configuration varies the focal power of the variable lens, including the amplified focal power. A relatively large change in the focal power of the lens may be obtained by making a relatively small change in the meniscus configuration, in comparison with systems of the prior art.

International patent application WO 2004/102251 discloses an adjustable mirror in which a fluid meniscus configuration is varied using electrowetting forces. An adjustable mirror function is provided by a reflective surface in combination with a lens function of the meniscus.

In accordance with the present invention, the configuration of the meniscus may be controlled by electrowetting forces, involving the application of a voltage across the lens fluids. As the focal power of the lens is an amplified focal power, a smaller applied voltage is required to obtain a desired focal power than for systems of the prior art. Further, when switching between different meniscus configurations, the change of voltage required to obtain a desired focal power change is relatively small in comparison with the prior art. This provides rapid switching of the focal power of the lens.

Passing of a radiation beam only once through the fluid meniscus may lead to an introduction of chromatic aberration into the beam. By redirecting the beam so that it makes further passes through the meniscus, the amount of chromatic aberration introduced is reduced. This is beneficial for applications which require a beam having minimal chromatic aberration.

Preferably, the optical apparatus is arranged to modify a polarisation of a radiation beam passing through said optical apparatus, so as to improve an operation of at least one of said first and said second redirector.

The first and second redirector, and optical elements which co-operate with the redirectors, may be constructed to modify a polarisation of the radiation beam. This allows the passing of a radiation beam through the optical apparatus to be controlled in a desired manner.

Preferably, the first redirector is a first mirror arranged to reflect said radiation beam towards said fluid meniscus.

When the first redirector is a first mirror, the input radiation beam, having passed once through the meniscus, is reflected back towards and through the fluid meniscus. By passing again through the meniscus the vergence is further modified and the focal power is amplified.

It is preferred that the second redirector is a second mirror arranged to reflect said radiation beam towards said fluid meniscus.

When the second redirector is a second mirror, the radiation beam, after having been reflected by the first mirror, may be further reflected so as to make a yet further pass through the fluid meniscus.

During this yet further pass, the meniscus modifies the vergence yet further which further amplifies the focal power of the lens. The amplified focal power allows more efficient focal power switching to be provided. Where the fluid meniscus configuration is determined by electrowetting forces, the applied voltage required for a particular focal power is further reduced.

The optical apparatus of the present invention may be advantageously incorporated within applications where a variable focus lens is required to provide a large range of focal powers and an efficient and rapid switching of the focal power.

In accordance with a second aspect of the present invention there is provided an image capture device for capturing an image of an object, said device including an image detection system for detecting an image of an object and an optical system arranged to focus an image of the object onto said image detection system, wherein said optical system includes optical apparatus in accordance with the present invention.

In a third aspect of the present invention there is provided an optical zoom lens system including optical apparatus in accordance with the present invention.

A fourth aspect of the present invention provides an optical scanning device for scanning an optical record carrier, said device including:

a) a radiation source system for emitting a radiation beam;

b) a detection system for detecting a radiation beam carrying information derived from an optical record carrier; and c) an optical system for focusing said emitted radiation beam at an optical record carrier and for focusing said emitted radiation beam, after having been focused at said record carrier, onto said detection system, wherein said optical system includes optical apparatus in accordance with the present invention.

Further features and advantages of the invention will become apparent from the following description of preferred embodiments of the invention, given by way of example only, which is made with reference to the accompanying drawings.

FIGS. 1 and 2 show schematically a variable focus lens 1 in accordance with the prior art, namely that disclosed by international patent application WO 03/069380.

Figure 1:
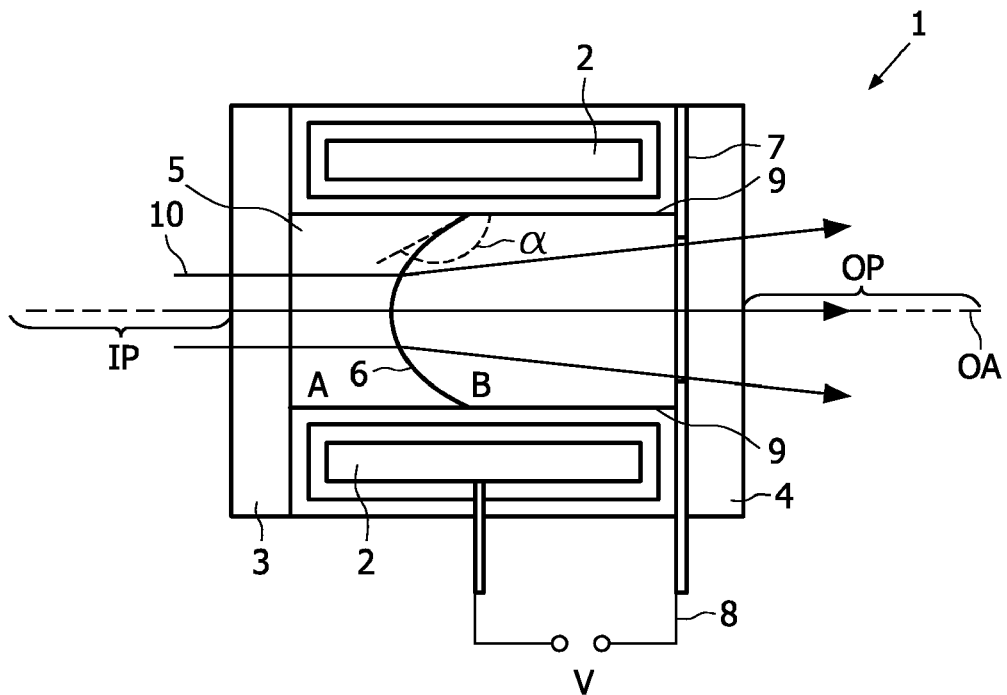
FIGS. 1 and 2 show a variable focus lens in accordance with the prior art.

The variable focus lens 1 comprises a cylindrical first electrode 2 which is sealed by a transparent front element 3 and a transparent back element 4 to form a fluid chamber 5.

The fluid chamber 5 contains two non-miscible fluids which are an electrically insulating first liquid A, such as a silicone oil or an alkane, and an electrically conducting second liquid B, such as water containing a salt solution. The two liquids are separated from each other by a fluid meniscus 6 having a configuration which, as shown, has an aspherical curvature which is rotationally symmetric about an optical axis OA of the lens 1. The two liquids are preferably arranged to have an equal density so that the configuration of the meniscus 6 may be controlled independently of an orientation of the variable lens 1. The first liquid A has a first refractive index and the second liquid B has a second different, refractive index.

A second electrode 7 is annular and is arranged at one end of the fluid chamber 5, in this case, adjacent the back element 4. The second electrode 7 is arranged with at least one part in the fluid chamber 5 such that the electrode acts on the second fluid B.

The configuration of the meniscus 6 determines a focal power provided by the lens 1. A focus control system 8 is arranged to control the focal power by variation of this configuration. The control system 8 is electrically connected to the first and second electrodes 2, 7 and varies the configuration by varying a voltage V applied across the first and second electrodes 2, 7. Due to meniscus electrowetting forces, the wettability of a fluid contact layer 9 of the first electrode 2, by the second fluid B, varies under the application of the voltage V by the control system 8. This changes a contact angle α of the meniscus 6 at a three phase line (the line of contact between the fluid contact layer 9 and the two liquids A and B).

FIG. 1 shows the meniscus 6 with a configuration having a convex curvature, when viewed from the front element 3, which is obtained by an applied voltage V. The lens 1 has an input path IP and an output path OP which are separate from each other and which are coincident with the optical axis OA. A radiation beam 10 passes into the lens 1 along the input path IP and has a predetermined vergence. The beam passes along the optical axis OA and, with the meniscus 6 having been configured by the control system 8, the meniscus 6 modifies the vergence of the radiation beam. The modified beam passes out of the lens 1 along the output path OP.

Figure 2:
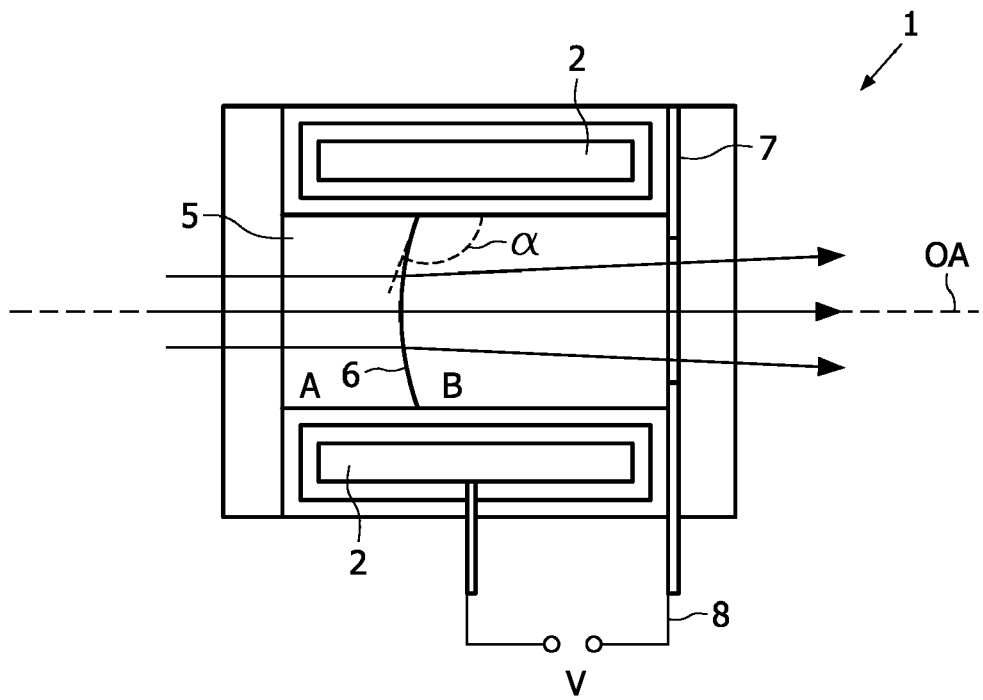

FIG. 2 shows the meniscus 6 having a different configuration which is a convex curvature and which corresponds with a reduced contact angle α. The control system 8 applies a different voltage V in order to obtain this configuration and the vergence of a radiation beam passing through the lens 1 is modified differently.

Further features and elements of the variable focus lens are described in accordance with international patent application WO 03/069380, the contents of which is incorporated herein by reference.

Figure 3:
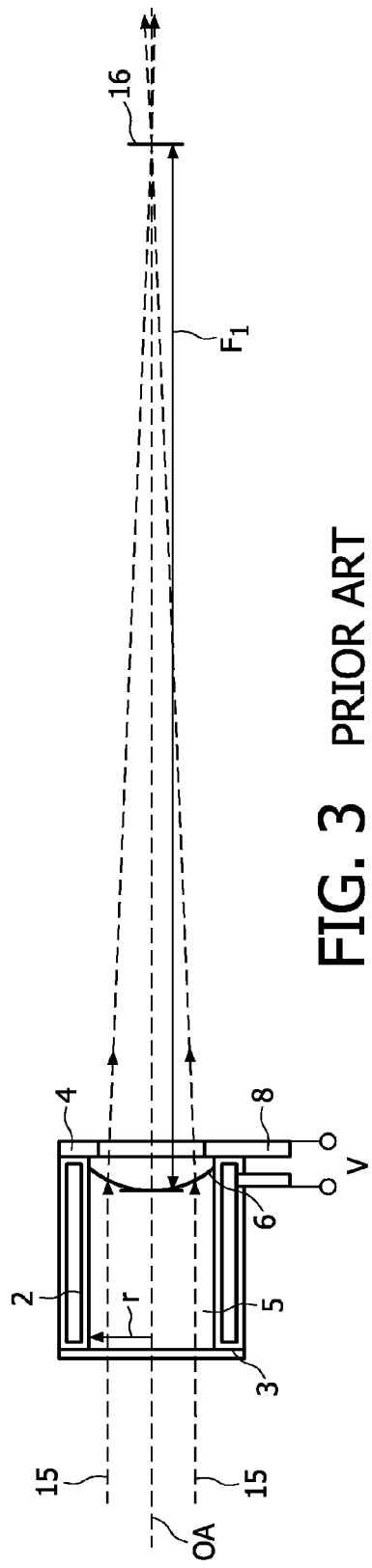
FIG. 3 shows a focal power provided by optical apparatus in accordance with the prior art.
Figure 5:
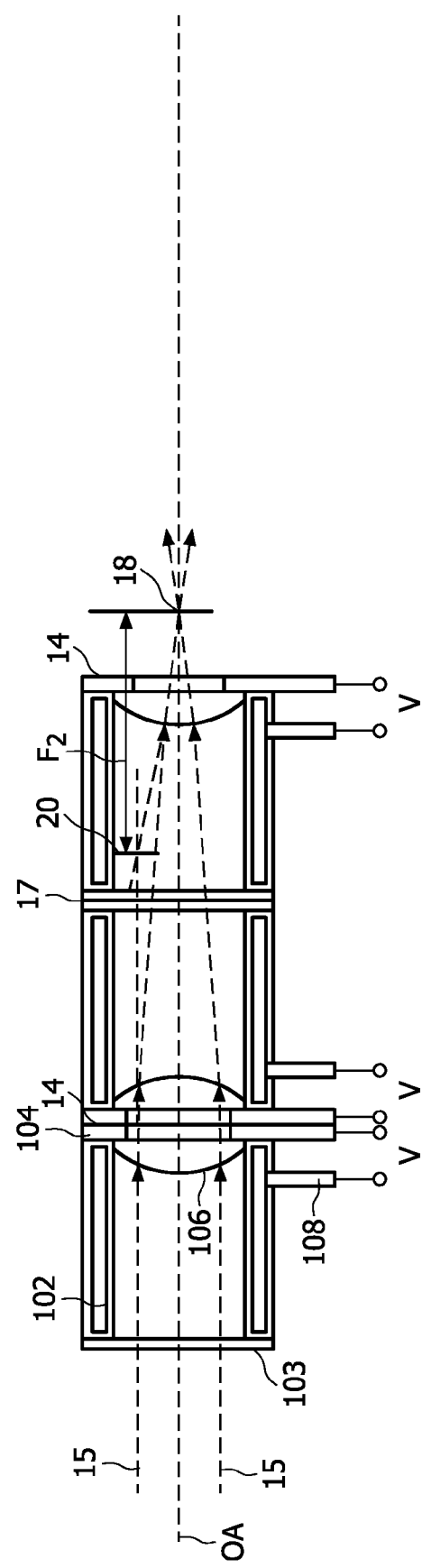
FIG. 5 shows an amplified focal power provided by optical apparatus in accordance with the present invention.

FIGS. 3 and 5 illustrate a principle of operation of the optical apparatus of the present invention for a radiation beam 15 having a predetermined vergence, in comparison with operation of the optical apparatus of the described prior art.

FIG. 3 shows operation of the variable focus lens in accordance with the prior art described using FIGS. 1 and 2. The meniscus 6 has a configuration with a convex curvature, when viewed from the front element 3, and the first and second fluids A, B have refractive indices so that a vergence of a radiation beam passing through the meniscus 6 is converged by the meniscus 6 so as to provide a positive focal power.

A focal power may be measured by a focal length of a lens. FIG. 3 illustrates schematically a focal length $F_1$ of the variable focus lens of the prior art. The radiation beam 15, as illustrated by marginal radiation rays, passes along the optical axis OA and through the meniscus 6 which focuses the beam at a focal point 16. The focal length $F_1$ is taken along the optical axis OA from the fluid meniscus 6 to the focal point 16.

Figure 4:
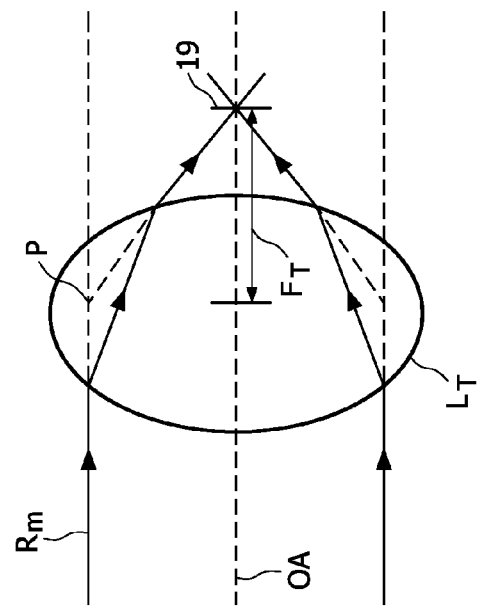
FIG. 4 shows schematically a focal power provided by a lens in accordance with the present invention.

FIG. 4 shows schematically how a focal length $F_T$ provided by a relatively thick lens is defined.

Marginal rays $R_m$ of an input radiation beam are refracted by the relatively thick lens $L_T$ to a focal point 19 on the optical axis OA. A distance along the optical axis OA from an intersection point P to the focal point 19 is the focal length $F_T$ of the thick lens $L_T$. The intersection point P lies at an intersection between an input path of the marginal rays $R_m$, if extended without being refracted by the lens $L_T$, and an output path of the marginal rays $R_m$, if extended back into the lens $L_T$ without being refracted by the lens $L_T$.

FIG. 5 shows schematically optical apparatus in accordance with the present invention which includes a variable focal lens in accordance with the variable focus lens of the prior art described using FIGS. 1, 2 and 3.

Features and elements of the lens of this embodiment are similar to features described previously and are referred to using the same reference numerals, incremented by 100; corresponding descriptions should be taken to apply here also.

In accordance with the present invention, the optical apparatus includes a first redirector which is arranged to redirect a radiation beam, after having passed once through the meniscus 106, back towards the meniscus 106. The apparatus further includes a second redirector which is arranged to further redirect the radiation beam, after having passed twice through the meniscus 106, back towards the meniscus 106. The configuration of the meniscus is arranged to further modify the vergence of the radiation beam following each of the redirections and the further modifications are arranged to provide the variable focus lens with an amplified focal power.

In embodiments of the present invention to be described below, the first redirector is a first mirror arranged to reflect the radiation beam towards the fluid meniscus 106 and the second redirector is a second mirror arranged to reflect the radiation beam towards the fluid meniscus 106. The first and the second mirror are located on the optical axis OA and each have a reflective surface 14, 17.

FIG. 5 is schematic and for clarity of illustration shows only the reflective surfaces 14, 17 of the first and second mirrors. The first and second reflective surfaces 14, 17 which each face towards the meniscus 106, are planar and perpendicular the optical axis OA.

FIG. 5 shows schematically a principle of operation of the optical apparatus. Three of the optical apparatus of the present invention are shown adjacent to each other so that the individual optical axes are coincident with each other. The first reflective surface 14 of the first optical apparatus, shown as the left-hand optical apparatus, is shown as being coincident with the first reflective surface 14 of the second optical apparatus, which is shown as the central optical apparatus. The second reflective surface 17 of the second apparatus is shown as being coincident with the second reflective surface 17 of the third optical apparatus, which is shown as the right-hand optical apparatus.

The meniscus 106 has a configuration with a convex curvature, when viewed from the front element 103, and the first and second fluids A, B have refractive indices so that a vergence of a radiation beam passing through the meniscus 106 is converged by the meniscus 106 so as to provide a positive focal power. In different embodiments the meniscus diverges a radiation beam so as to provide a negative focal power.

It is to be understood that the second and third optical apparatus shown in the figure are virtual apparatus, which are illustrated to show the optical apparatus if it was to be virtually unfolded about the reflective surfaces, in order to show passing of the beam through the apparatus.

In operation, the radiation beam, after having passed along the input path IP and through the fluid meniscus 106, is reflected by the first mirror so as to make a further pass through the meniscus 106. The meniscus configuration is arranged to further modify the vergence of the radiation beam. The second mirror further reflects the radiation beam to make a yet further pass through the meniscus 106 which yet further modifies the beam vergence. In this example the meniscus 106 converges the radiation beam at a focal point 18.

FIG. 5 illustrates schematically a focal length $F_2$ of the optical apparatus in accordance with the present invention.

The focal length $F_2$ is in accordance with the definition of the focal length provided by a relatively thick lens, illustrated using FIG. 4. The focal length $F_2$ is taken in a direction parallel the optical axis OA from an intersection point 20 to the focal point 18. The intersection point 20 lies at the intersection between the input path of the beam 15, if extended without being refracted by the meniscus 106, and the output path of the beam 15, if extended back into the apparatus without refraction by the meniscus 106. The further modifications of the radiation beam by the meniscus 106 provides the variable focus lens with an amplified focal power and this causes the focal length $F_2$ provided by the present invention to be less than the focal length $F_1$ provided by the prior art.

For the optical apparatus described using FIGS. 3 and 5, the first fluid

A has a refractive index of $n_A=1.35$ and the second fluid B has a refractive index of $n_B=1.5$. A radius r of the meniscus formed between the two fluids A and B in the fluid chamber 105 is 2 mm. The focal length $F_1$ in accordance with the prior art, is 13.33 mm and the focal length $F_2$, in accordance with the present invention, is 4.97 mm.

A thickness of the first fluid A and of the second fluid B, along the optical axis OA, modifies the focal length of the variable focus lens. In this example the thickness of fluid A is 1 mm and the thickness of the second fluid B is 0.5 mm. When the thickness of the two fluids A, B is small in comparison with the focal length F of the optical apparatus, the focal length $F_1$ of the lens, in accordance with the prior art, is approximately in accordance with relationship 1:

$$F_1 = \frac{r}{n_B - n_A} \quad (1)$$

The focal length $F_2$ of the lens, provided in accordance with the present invention, is approximately in accordance with relationship 2:

$$F_2 = \frac{r}{3(n_B - n_A)} \quad (2)$$

Using relationships 1 and 2, the focal lengths $F_1$, $F_2$ in accordance with the prior art and the present invention, respectively, are calculated to be approximately 13.33 mm and 4.44 mm, respectively.

In further embodiments where the thickness of the second fluid B is greater than that described previously, the thickness further modifies the focal length provided by the optical apparatus.

It has been described that the fluid meniscus 106 has a convex curvature which converges a radiation beam passing through the meniscus 106. The fluid meniscus 106 may, alternatively, be configured to diverge a radiation beam passing through the meniscus 106. In such embodiments the focal power of the variable focus lens is also amplified in comparison with the prior art. The modification of the vergence is determined by the refractive indices of the first and second fluids A, B and by the applied voltage V. The meniscus 106 may be configurable by the control system to have a concave curvature or a planar configuration. The refractive indices of the fluids and/or the material of the fluids may be different to those described.

Figure 6:
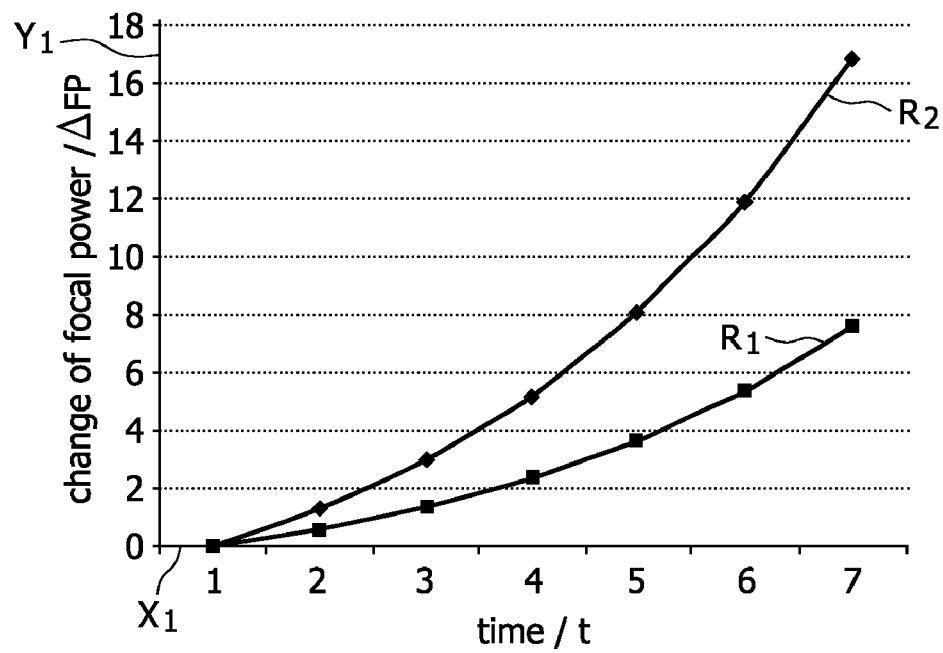
FIGS. 6 and 7 show schematically relationships of a focal power provided by embodiments of the present invention, in comparison with the prior art.

FIG. 6 shows schematically relationships between an amount of change of focal power ($\Delta FP$), plotted on a vertical axis $Y_1$, against a time (t) taken to obtain a certain amount of change of focal power, plotted on a horizontal axis $X_1$. A first relationship $R_1$ corresponds to the variable focus lens of the prior art and a second relationship $R_2$ corresponds to optical apparatus in accordance with the present invention. The units on the axes $Y_1$, $X_1$ are arbitrary.

The second relationship $R_2$, when compared with the first relationship $R_1$, indicates that the amount of time taken for the apparatus of the present invention to provide a certain change of focal power is generally lower than the amount of time taken for the variable focus lens of the prior art to provide the same change of focal power.

Figure 7:
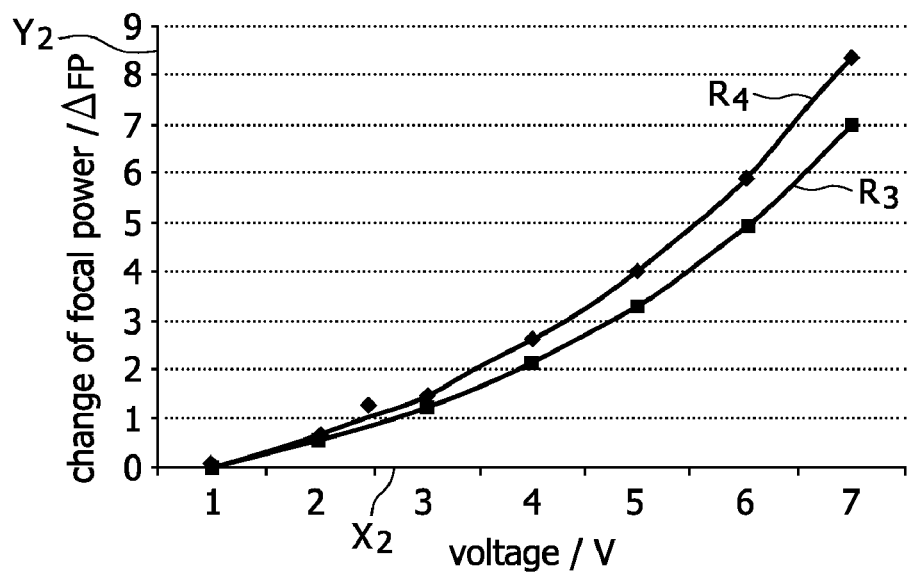

FIG. 7 shows schematically relationships between an amount of change of focal power (ΔFP), plotted on a vertical axis $Y_2$, against a voltage (V) required to achieve a certain amount of change of focal power, plotted on a horizontal axis $X_2$. A third relationship $R_3$ corresponds to the variable focus lens of the prior art and a fourth relationship $R_4$ corresponds to optical apparatus in accordance with the present invention. The units on the axes $Y_2$, $X_2$ are arbitrary.

The fourth relationship $R_4$, when compared with the third relationship $R_3$, indicates that the amount of voltage required for the apparatus of the present invention to provide a certain change of focal power is generally lower than the amount of voltage required for the variable focus lens of the prior art to provide the same change of focal power.

Figure 8:
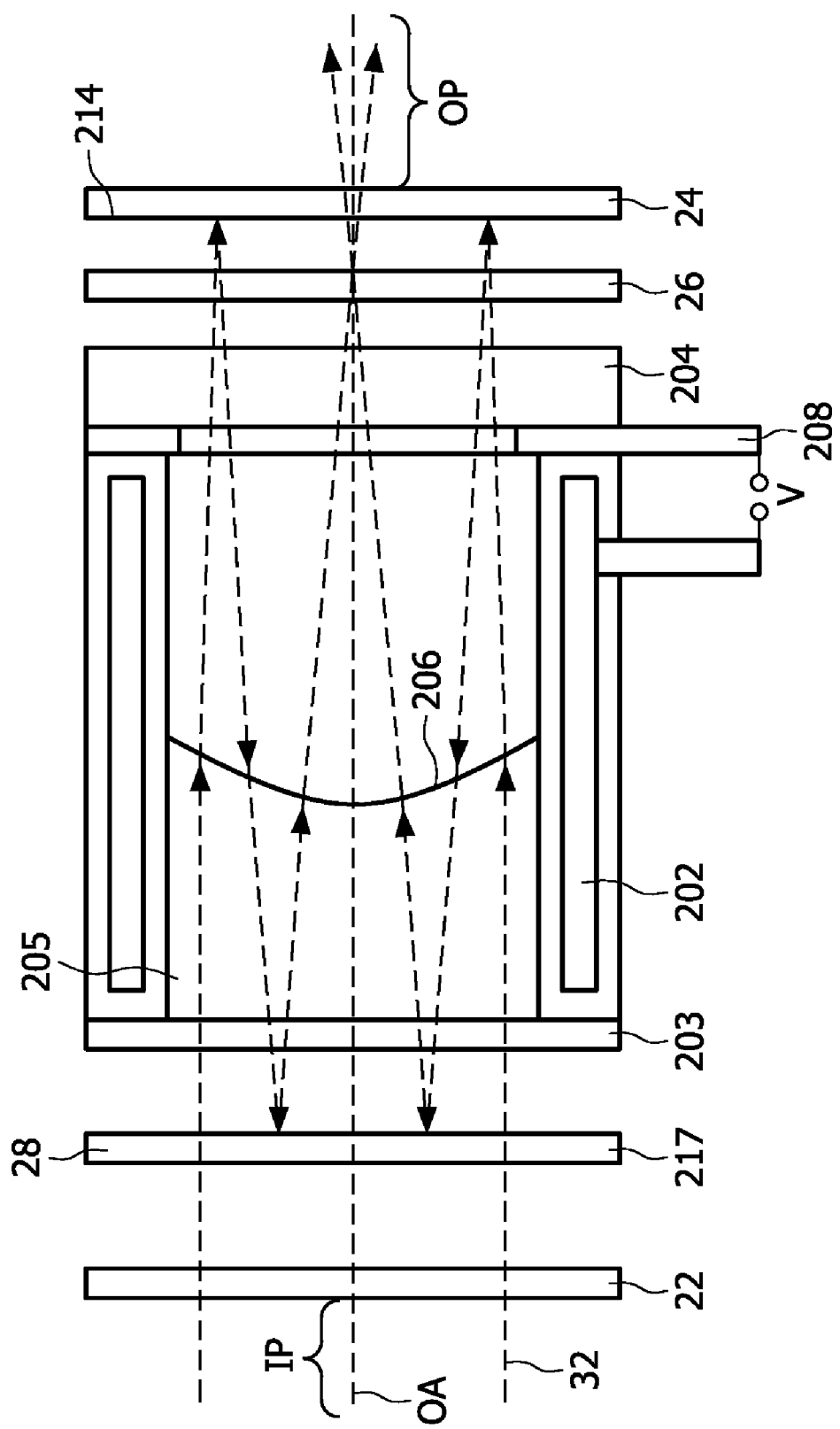
FIGS. 8 and 9 show optical apparatus in accordance with different embodiments of the present invention.

FIG. 8 shows schematically optical apparatus in accordance with an embodiment of the present invention. Features and elements of this embodiment are similar to features described previously and similar reference numerals will be used, incremented by 200. Corresponding descriptions should be taken to apply here also.

In this embodiment the configuration of the fluid meniscus 206 converges a radiation beam. The optical apparatus includes a first quarter wavelength plate 22, the first mirror, which is a polarisation dependent mirror 24, a second quarter wavelength plate 26 and the second mirror, which is a partially transmissive mirror 28. The second quarter wavelength plate 26 lies between the back element 204 and the polarisation dependent mirror 24. The reflective surface 217 of the polarisation dependent mirror 24 comprises a reflective coating of, for example, a Dual Brightness Enhancement Film (DBEF) as produced by 3M™.

A radiation beam 32 passing along the optical axis OA, and immediately after having passed along the input path IP, has a linear polarisation with a first direction which is modified to a circular polarisation, for example a right-handed circular polarisation, by the first quarter wavelength plate 22. The partially transmissive mirror 28 is arranged to allow at least part of the radiation beam 32 to pass through the partially transmissive mirror 28. The radiation beam 32 passes through the fluid meniscus 206 and the second quarter wavelength plate 26 modifies the right-handed circular polarisation to a linear polarisation in a second direction, which is perpendicular to the first direction of polarisation. The radiation beam 32 is reflected by the first reflective surface 214 and passes through the second quarter wavelength plate 26 which modifies the polarisation in the second direction to a right-handed circular polarisation. The radiation beam 32 then makes a second pass through the fluid meniscus 206 and is reflected by the partially transmissive mirror 28 back towards the meniscus 206 so as to make a third pass through the meniscus 206. Reflection of the beam by the partially transmissive mirror 28 modifies the right-handed circular polarisation to a left-handed circular polarisation which the second quarter wavelength plate 26 then modifies to the polarisation in the first direction. The surface 214 of the polarisation dependent mirror 24 is arranged to allow at least part of the further reflected radiation beam to pass through the polarisation dependent mirror 24 and along the output path OP.

In a further embodiment the first and second fluids A, B may comprise materials which cause the fluid meniscus 206 to act as a partially transmissive mirror. In such an embodiment the first mirror is not required.

In the embodiment described above the polarisation dependent mirror 24 is arranged to control the passing of the further reflected beam through the polarisation dependent mirror by selecting radiation with a certain polarisation and the partially transmissive mirror 28 is arranged to control the passing of the input radiation beam through the partially transmissive mirror 28 by allowing a certain proportion of radiation to pass through the partially transmissive mirror. In further embodiments the polarisation dependent mirror and the partially transmissive mirror may be different to those described.

Figure 9:
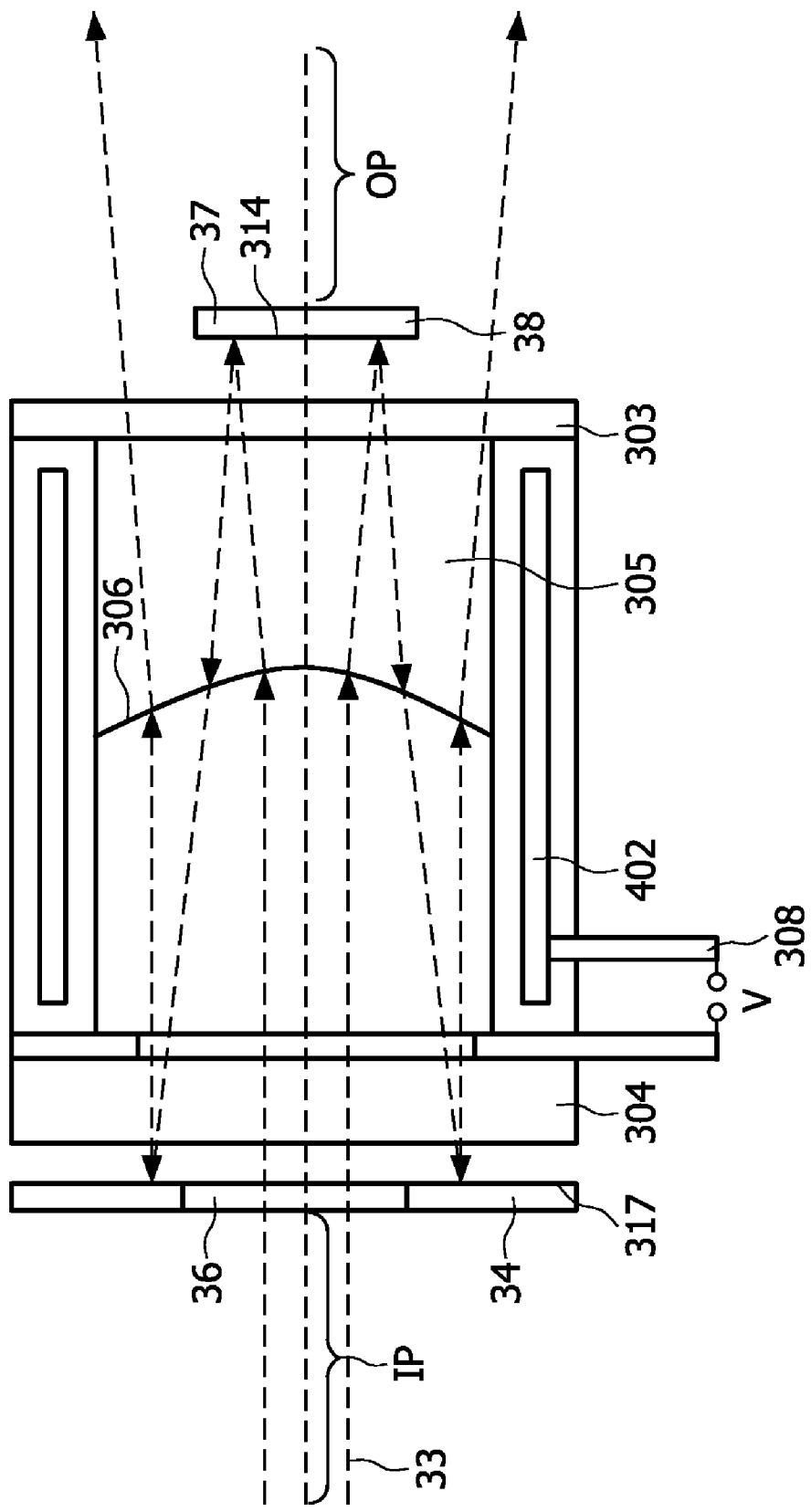

FIG. 9 shows schematically optical apparatus in accordance with a different embodiment of the present invention where the apparatus is in the form of a catadioptric system. Features and elements of this embodiment are similar to features described previously and similar reference numerals will be used, incremented by 300. Corresponding descriptions should be taken to apply here also.

In this embodiment the configuration of the fluid meniscus 306 is a convex curvature when viewed from the front element 303 and diverges a radiation beam. The second mirror has a shape which is arranged so that at least part of the input radiation beam, immediately after having passed along the input path IP, does not irradiate the second mirror, which in this embodiment is an annular mirror 34 having a planar reflective surface 317 which faces the meniscus 306. The annular mirror 34 has an inner aperture 36 which is transparent and which has a radius perpendicular the optical axis OA which is less than a radius perpendicular the optical axis OA of the chamber 5. The first mirror 37 has a shape which is arranged so that at least part of a radiation beam, after having been reflected by the second mirror 34, does not irradiate the first mirror 37. The first mirror 37 has a radius perpendicular the optical axis OA which is less than the radius perpendicular the optical axis OA of the cylindrical fluid chamber 5. In this example, the first mirror 37 is located on the optical axis OA adjacent the front element 303 and the second mirror 34 is located on the optical axis OA adjacent the back element 304.

A radiation beam 33 passing along the optical axis OA, and immediately having passed along the input path IP, passes through the inner aperture 36 and through the fluid meniscus 306. In this embodiment the variable focus lens has a different orientation to that described for previous embodiments so that the radiation beam, after having passed through the inner aperture 36, passes through the back element 304 and the second fluid B before reaching the meniscus 306. The radiation beam 33 passes through the front element 303 and is reflected back through the fluid meniscus 306 by the first reflective surface 314. A part of the beam is further reflected back through the meniscus 306 by the second reflective surface 317 and passes to the side of a peripheral edge 38 of the first mirror 37. The output beam has an annular intensity cross-section which is centred about the output path OP.

In a further embodiment, a radiation beam may pass through the apparatus in the opposite direction to that described for the previous embodiment so that part of an input radiation beam passes the peripheral edge 38 and, following reflection and further reflection, is output from the apparatus through the inner aperture 36.

In a yet further embodiment, the first mirror of the apparatus described using FIG. 9 may alternatively be a further annular mirror with an outer periphery having a radius perpendicular from the optical axis OA which is less than the radius of the annular mirror 34. The meniscus diverges the input radiation beam, having passed through the aperture 36, so that the further annular mirror reflects the radiation beam on to the annular mirror 34 for further reflection so as to output the beam past an outer periphery of the further annular mirror.

In a further embodiment, the apparatus may be similar to that described for the previous embodiment, but the radiation beam passes in the opposite direction so that at least part of the input radiation beam instead passes an outer periphery of the further annular mirror and is converged by the meniscus prior to being reflected by the annular mirror, further reflected by the further annular mirror, and output through the inner aperture 36.

In a yet further embodiment where both the first and the second mirrors are annular, the radiation beam passes through the aperture of the second mirror and, having been diverged by the meniscus, is reflected by the reflective surface of the first mirror so as to make a further pass through the meniscus. The reflective surface of the second mirror then further reflects the radiation beam so that the beam is redirected to pass through a central aperture of the first mirror and out of the apparatus. In order to control the passing of the beam through the apparatus in this way, the reflective surface of the first and/or the second mirror may not be planar, but may be curved.

Figure 10:
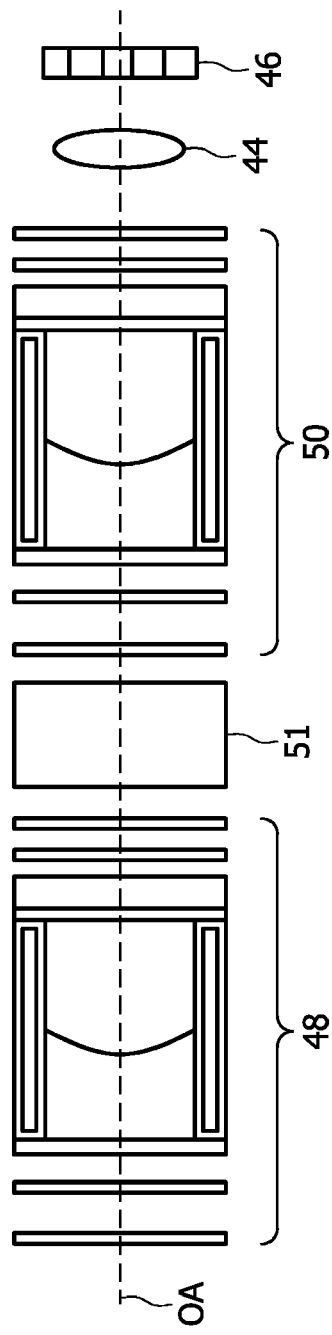
FIG. 10 shows schematically an image capture device including optical apparatus in accordance with an embodiment of the invention.

FIG. 10 shows schematically an image capture device, for example a camera. The device has an optical axis OA for a radiation beam carrying an image of an object to pass along. The device has an optical system which has a zoom lens system which comprises two of the optical apparatus 48, 50 in accordance with that described previously using FIG. 8. Each fluid meniscus has a configuration which, in combination with each other, introduce a zoom factor into the image carried by the radiation beam. The optical system also has an objective system 44 for focusing the zoomed image onto an image detection system 46 for detecting an image of the object. The optical system further includes lenses 51 which modify the radiation beam to ensure that the beam is correctly focused on the detection system 46. In an alternative image capture device, each of the two optical apparatus is in accordance with the apparatus described previously using FIG. 9.

The optical apparatus may be included within a zoom lens system which is different to that described with reference to FIG. 10. One example is a zoom lens system comprising at least one switchable optical element which includes a wavefront modifier having a part which is arranged to act upon a radiation beam passing through the zoom lens system. The switchable element also includes a first fluid and a second fluid. The first and the second fluid have a different refractive index to each other and are immiscible with each other. The switchable element has a first mode and a second mode. In the first mode the switchable element has a fluid configuration in which the first fluid covers the wavefront modifier part and in the second mode the switchable element has a different fluid configuration in which the second fluid instead covers the wavefront modifier part. The switchable element can be switched between the first and the second modes using a switching system which may, for example, apply a voltage to at least one of the first and the second fluid. The switchable element introduces a zoom factor into a radiation beam passing through the zoom lens system. The zoom factor which is introduced when the element is in the first mode is different to the zoom factor which is introduced when the element is in the second mode.

Figure 11:
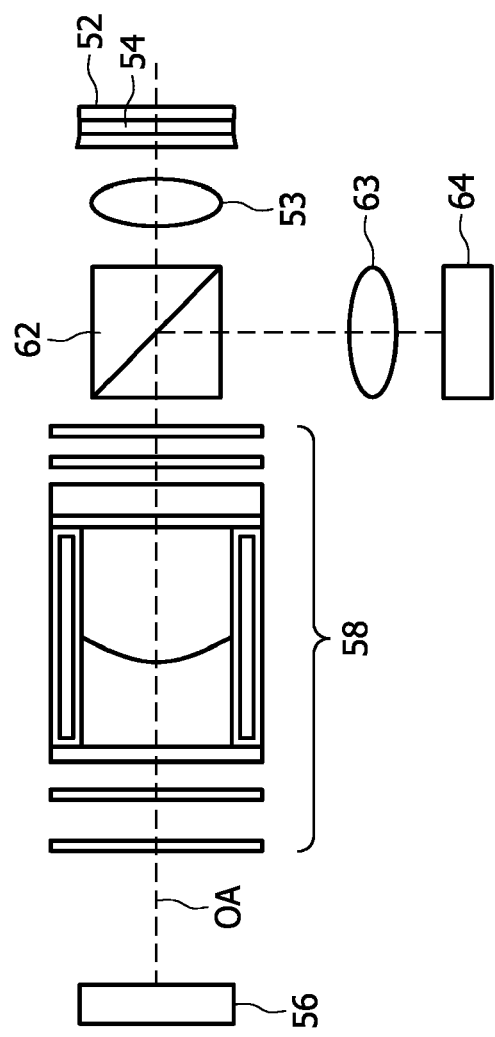
FIG. 11 shows schematically an optical scanning device including optical apparatus in accordance with an embodiment of the invention.

FIG. 11 shows schematically an optical scanning device for scanning an optical record carrier 52 having an information layer 54. The device has a radiation source system 56 for emitting a radiation beam of a predetermined wavelength along an optical axis OA. The radiation beam is focused at the information layer 54 by an optical system, which includes optical apparatus 58 in accordance with the apparatus previously described using FIG. 8 and a first objective system 53. The focused radiation beam is reflected by the information layer 54 and a beam splitter 62 directs the radiation beam, which carries information derived from the information layer 54, to a second objective system 63 of the optical system which focuses the radiation beam onto a detection system 64 which is arranged to detect the radiation beam.

In an alternative optical scanning device, the optical apparatus is instead in accordance with the apparatus described previously using FIG. 9.

The above embodiments are to be understood as illustrative examples of the invention. Further embodiments of the invention are envisaged. For example, the specification of optical elements described may be different. The reflective surface of the first or the second mirror may not be planar, but may be concave, convex or a combination of these and may also be orientated differently in relation to the optical axis. Furthermore, the first mirror or the second mirror may have a different shape to those described or a material used to form the reflective surface may be different.

Embodiments have been described where the meniscus converges a radiation beam. In such embodiments the meniscus may be alternatively configured so as to diverge the radiation beam. In embodiments described where the meniscus diverges a radiation beam, the meniscus may alternatively be configured to converge a radiation beam. The meniscus has been described with rotationally symmetric configurations. The meniscus may be configured into configurations which are rotationally asymmetric about the optical axis.

For each of the described embodiments, the radiation beam passing along the input path has a predetermined vergence which is a collimated vergence. The input beam may alternatively be convergent or divergent.

Embodiments have been described where use is made of a beam with a polarisation which provides control of the passing of the beam through the apparatus. This improves the operation of the redirectors. The apparatus may operate with a radiation beam having different polarisations to those described and may be arranged to differently modify the beam polarisation.

In the embodiments described previously, the input and output paths are coincident with the optical axis. The input and optical paths may, alternatively, have a different positioning with respect to the optical axis than described, so that the paths are non-coincident with the optical axis.

Embodiments have been described where the apparatus includes two redirectors so that the radiation beam makes three passes through the meniscus. The redirectors may not be mirrors, as described, but may be alternative optical elements for redirecting the beam. Furthermore, the apparatus may include further redirectors so that the beam may make more than three passes through the meniscus.

For embodiments described previously, rays of the radiation beam pass each time through the meniscus at a different radial position with respect to the optical axis and/or at a different angle of incidence with respect to the meniscus. Variation of these angles of incidence and/or of these radial positions causes the modification of vergence to change. It is envisaged that the apparatus may be arranged to pass radiation beam rays through the meniscus at different incidence angles and/or different radial positions to those described.

Alternatively, the meniscus may be configured to not modify a vergence of a beam.

The amount of amplified focal power provided by the present invention, indicated by the focal length, may be different to that described previously. In order to achieve this, the refractive indices of the fluids A, B, the thickness of the fluids along the optical axis OA and the radius of the chamber may be different to those described previously.

The present invention has been described in relation to variable focus lenses using electrowetting forces. The apparatus may, alternatively, include a different type of variable focus lens which does not use electrowetting forces.

Devices which include the optical apparatus have been described. Such devices may be different to those described and may include optical apparatus in accordance with different embodiments of the present invention.

Further applications of the optical apparatus are envisaged. For example the apparatus may be included in an illumination device, such as a torch, where it is desired to vary the size of an area which is illuminated. The apparatus may be incorporated in devices which include a camera, such as a mobile telephone, a photo and video camera, medical equipment, data recording and reading equipment, identification equipment and automotive equipment. The apparatus may also be included within a telescope.

Embodiments of the apparatus, for example the catadioptric system described using FIG. 9, operate without use of a polarised radiation beam. Such apparatus may be advantageously used in applications which require operation which is independent of polarisation, for example in a camera. The apparatus generally introduces a low chromatic aberration for radiation beams passing through the apparatus. Passing the radiation beam more than once through the meniscus minimises an overall amount of chromatic aberration introduced into the beam.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. Optical apparatus for modifying a radiation beam, said apparatus including:
    a) a variable focus lens (1) comprising a first fluid (A) having a first refractive index and a second fluid (B) having a second, different, refractive index, wherein said fluids are immiscible and are separated from each other by a fluid meniscus (6; 106; 206; 306) which is configurable into a configuration which is arranged to modify a predetermined vergence of an input radiation beam (15; 32; 33), whereby said configuration determines a focal power of said lens; and
    b) a focus control system (8; 108; 208; 308) arranged to control said focal power by variation of the configuration of said fluid meniscus,
    characterised in that the optical apparatus comprises a first redirector arranged to redirect said radiation beam, after having passed once through said fluid meniscus, back towards said fluid meniscus, and a second redirector arranged to further redirect said radiation beam, after having passed twice through said meniscus, back towards said fluid meniscus, wherein said configuration is arranged to further modify the vergence of said radiation beam following each of said redirections, said further modifications being arranged to provide said variable focus lens with an amplified focal power.

2. Optical apparatus according to claim 1, wherein said fluid meniscus configuration is arranged to converge a radiation beam passing through said fluid meniscus.

3. Optical apparatus according to claim 1, wherein said fluid meniscus configuration is arranged to diverge a radiation beam passing through said fluid meniscus.

4. Optical apparatus according to claim 1, wherein said apparatus is arranged to modify a polarisation of a radiation beam passing through said optical apparatus, so as to improve an operation of at least one of said first and said second redirector.

5. Optical apparatus according to claim 1, wherein said first redirector is a first mirror (24; 38) arranged to reflect said radiation beam towards said fluid meniscus.

6. Optical apparatus according to claim 5, wherein said first mirror has a shape which is arranged so that at least part of said further redirected radiation beam does not irradiate said first mirror.

7. Optical apparatus according to claim 5, wherein said first mirror is arranged to allow at least part of said further redirected beam to pass through said first mirror and said first mirror is arranged to control the passing of said further redirected beam through said first mirror.

8. Optical apparatus according to claim 1, wherein said second redirector is a second mirror (22; 34) arranged to reflect said radiation beam towards said fluid meniscus.

9. Optical apparatus according to claim 8, wherein said second mirror has a shape which is arranged so that at least part of said input radiation beam does not irradiate said second mirror.

10. Optical apparatus according to claim 9, wherein said second mirror is annular.

11. Optical apparatus according to claim 8, wherein said second mirror is arranged to allow at least part of said input radiation beam to pass through said second mirror and said second mirror is arranged to control the passing of said input radiation beam through said second mirror.

12. An image capture device for capturing an image of an object, said device including an image detection system (46) for detecting an image of an object and an optical system arranged to focus an image of the object onto said image detection system, wherein said optical system includes optical apparatus (48; 50) in accordance with claim 1.

13. An optical zoom lens system including optical apparatus in accordance with claim 1.

14. An optical scanning device for scanning an optical record carrier, said device including:
    a) a radiation source system (56) for emitting a radiation beam;
    b) a detection system (64) for detecting a radiation beam carrying information derived from an optical record carrier (52); and
    c) an optical system for focusing said emitted radiation beam at an optical record carrier and for focusing said emitted radiation beam, after having been focused at said record carrier, onto said detection system, wherein said optical system includes optical apparatus (58) in accordance with claim 1.

* * * * *